Nov. 22, 1938.  G. H. OSGOOD  2,137,505
MACHINE FOR MAKING LAMINATED PANELS
Filed June 16, 1937  4 Sheets-Sheet 1
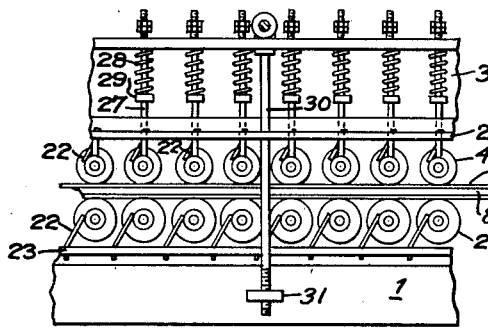
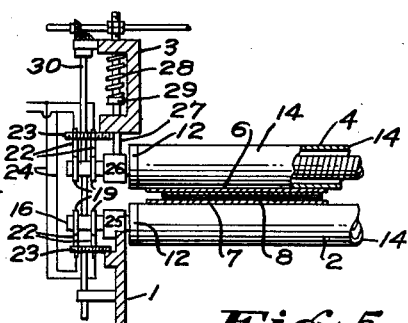
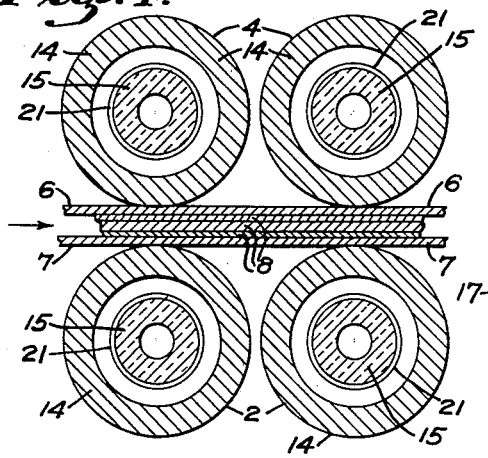
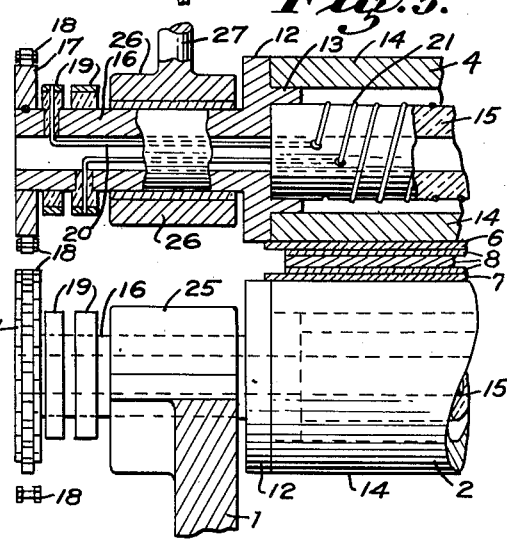
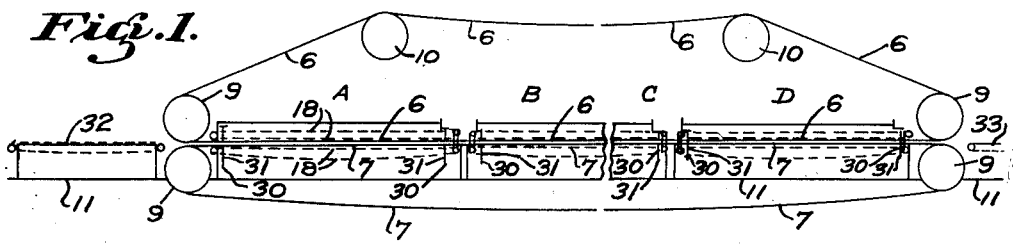
INVENTOR.
George H. Osgood
BY H. B. Moses
ATTORNEY Nov. 22, 1938.  G. H. OSGOOD  2,137,505
MACHINE FOR MAKING LAMINATED PANELS
Filed June 16, 1937  4 Sheets-Sheet 2
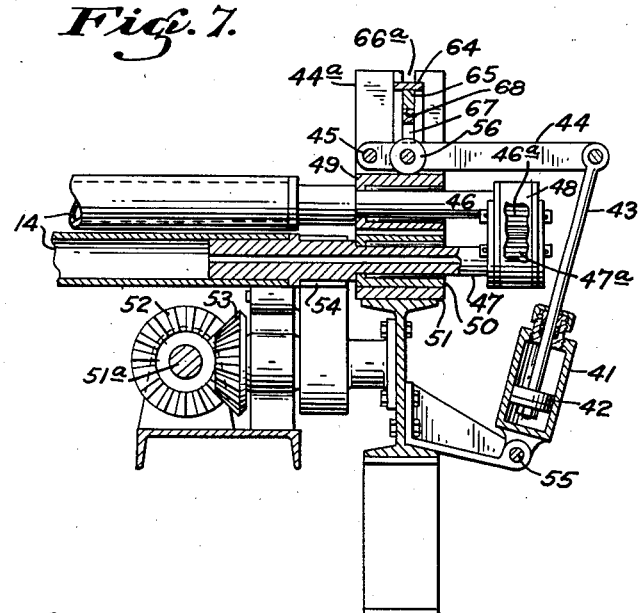
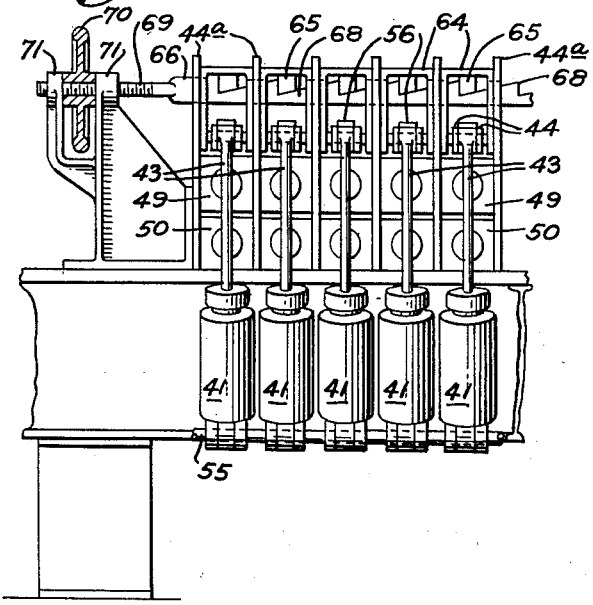
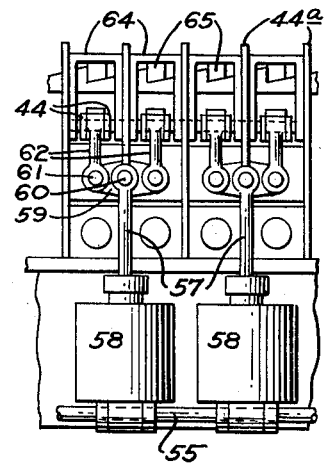
INVENTOR.
George H. Osgood
BY H. B. Moses
ATTORNEY.

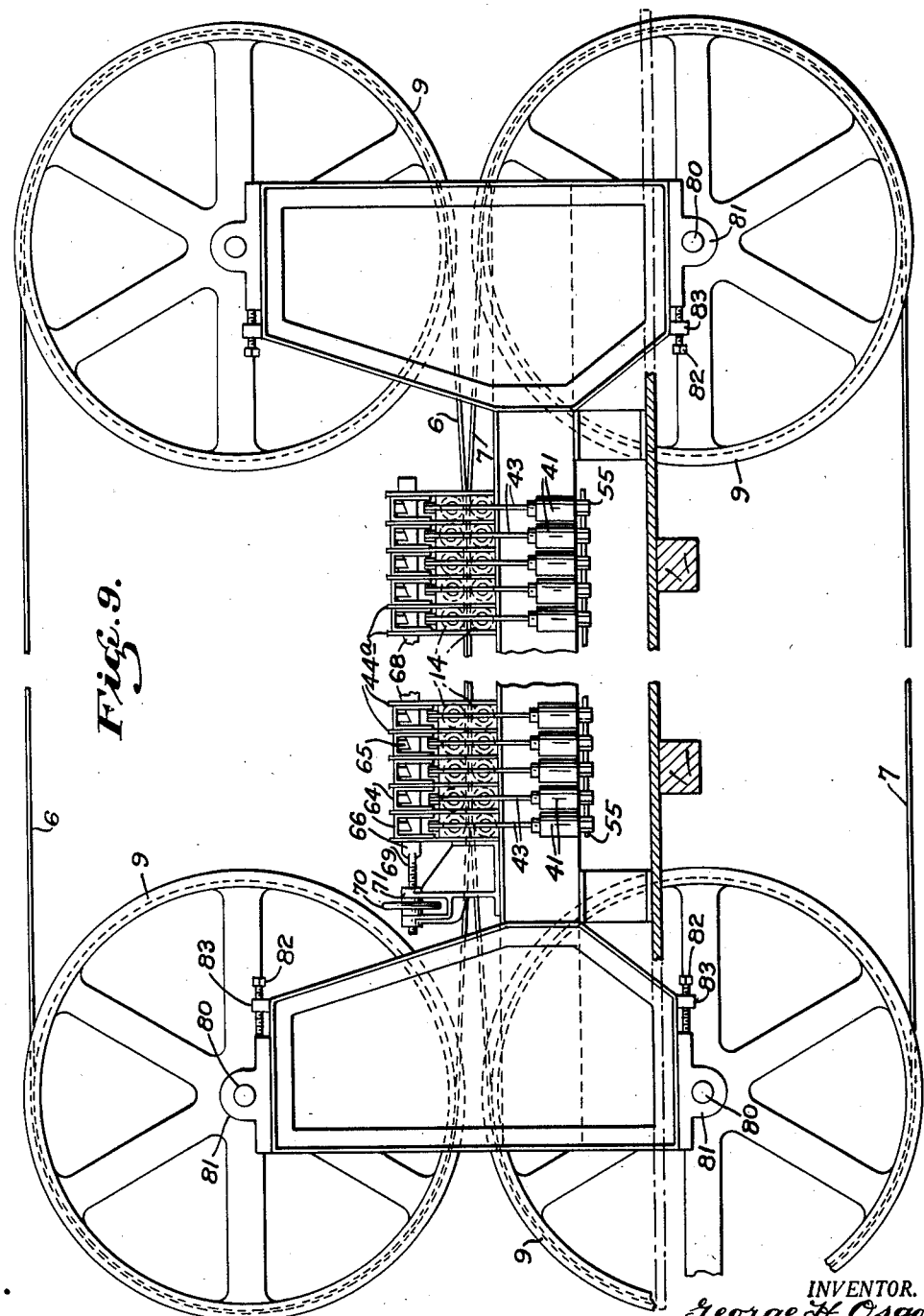

Nov. 22, 1938.　　　　G. H. OSGOOD　　　　2,137,505
MACHINE FOR MAKING LAMINATED PANELS
Filed June 16, 1937　　　4 Sheets-Sheet 4
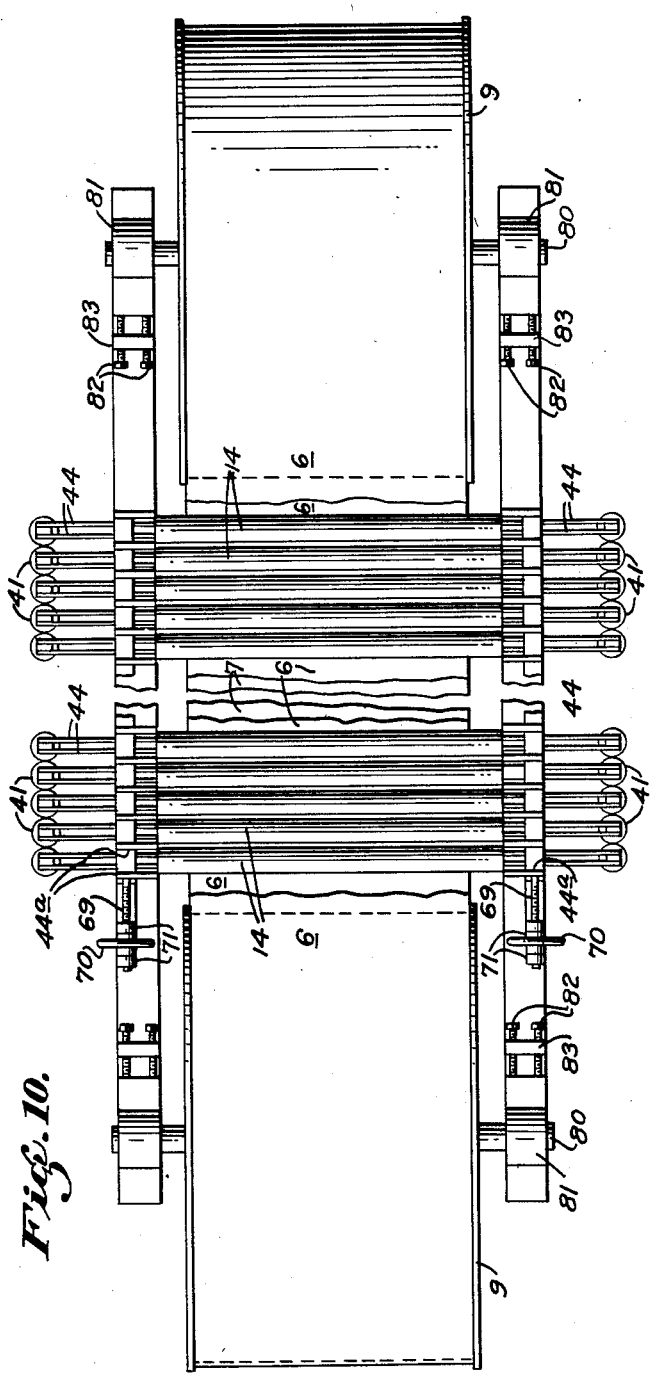
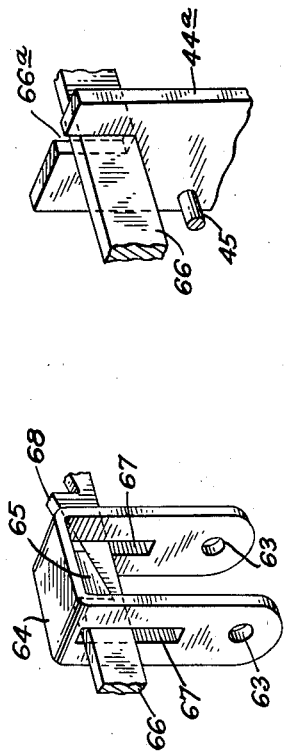
INVENTOR.
George H. Osgood
BY H. B. Moses
ATTORNEY Patented Nov. 22, 1938

2,137,505

UNITED STATES PATENT OFFICE 2,137,505

MACHINE FOR MAKING LAMINATED PANELS

George H. Osgood, Tacoma, Wash.

Application June 16, 1937, Serial No. 148,475

9 Claims. (Cl. 144—282)

This application includes the subject matter of my application, Ser. No. 5,728, filed Feb. 9, 1935, for Machine for hot-pressing laminated panels, and of my application Ser. No. 738,640, filed Aug. 6, 1934, and entitled "Continuous veneer panel press," and covers improvements over those patented March 26, 1929, under Patent No. 1,706,675, entitled "Apparatus for making plywood."

This invention relates to means for pressing glued porous plies together with or without the application of heat thereto, to form a multi-ply panel, it being especially adapted for continuous operation, that is, the freshly glued panels may be fed in one after another and these on being moved through the machine are pressed and delivered at the other end, the operation being continuous. The invention is adapted for making panels comprising sheets or plies of wood veneer glued together, for making laminated material comprising paper or cardboard glued to like material or to wood, and in fact for making laminated material comprising a layer of any suitable material glued to a layer of porous material.

Objects of my invention are to provide means whereby pressure is continuously applied to the panel or other assembly as it passes through the machine; whereby the pressure is continuous and of a pulsating or wave-like nature; whereby the glue is kneaded into the wood or analogous plies; whereby the minimum value of the pulsating pressure is great enough to prevent separation of the plies at any time while the glue is setting; whereby the pressure may be separately adjusted in the several parts of the machine or such pressure may be changed in one operation for several or all parts of the machine; whereby heat may be applied by continuous contact with a pair of heated metal plates or bands; whereby the temperature of the plates may be raised to any degree desired; whereby the said plates may be heated by direct contact with heated rolls and efficiently transmit the heat therefrom to the panels; whereby adjustment can be made for the tilting effect on the rollers usually caused by running a panel narrower than the machine through one side thereof; and whereby other objects may be accomplished which will be apparent on reading this specification.

Referring to the accompanying drawings which form a part of this specification—

Fig. 1 is a diagrammatic side view of my machine;

Fig. 2 is an enlarged side view of a portion of an exemplification;

Fig. 3 is a cross section of one side thereof;

Fig. 4 is a section of two pairs of heated rolls applying pressure through the plates to a veneer panel;

Fig. 5 is a partial cross section thereof;

Fig. 6 is a side view of a portion of another exemplification;

Fig. 7 is a partial section therethrough;

Fig. 8 is a side view of another exemplification;

Fig. 9 is a side view of the modification shown in Fig. 6;

Fig. 10 is a plan view thereof; and

Fig. 11 and Fig. 12 are perspective views of details.

Referring to Figs. 1–5 of the drawings, it will be seen that the machine is divided up into a plurality of sections, "A", "B", "C" and "D" etc., each similar to the others, and each comprising a main frame 1, on which a series of driven lower rolls 2 are mounted, and supporting an adjustable frame 3, on which a similar series of driven upper rolls 4 are resiliently mounted, said upper rolls 4 being pressed downwardly from said adjustable supplemental frame 3 by suitable pressure means, as by springs, and said adjustable frames 3 being each independently adjustable so that the pressure applied to the panel may be increased or decreased from section to section as the panel advances in the machine. The said sections are placed end to end in alinement and a pair of upper and lower thin steel sheets 6 and 7 are run in contact with the said rolls 2 and 4 respectively, continuously through the machine, from end to end, and receive the freshly glued panels 8 between them at one end, and discharge the completely made panels at the other end.

These sheets 6 and 7 are preferably but not necessarily made endless, as illustrated, being formed of thin steel, and being carried around suitable pulleys 9 at the ends. The returning portion of the upper sheet 6 is carried by suitable pulleys 10, away from the machine, while the returning portion of the lower sheet 7 may be preferably carried under the floor 11. The sheets are sufficiently flexible and yet stiff enough to bend around the large pulleys 9 and to produce differences in pressure on the work as it passes through the machine, the pressure being at a maximum between the rollers of a pair and at a minimum between the pairs of rollers, the minimum pressure applied to the work before the glue has set sufficiently, or while the glue is setting, being great enough to prevent separation of the plies sufficiently to break or weaken the glue line. This is important because the strength of a glue line is decreased by breaking it during the setting of the glue; and the product may be valueless. The pairs of rolls are preferably mounted with their axes or the nips between them as closely together as possible in order to reduce the distance in which the said sheets must carry the pressure, and to that end also the rolls are preferably made of as small a diameter as is practicable. The sheets are formed of thin steel so that there is some flexing thereof and slight differences in pressure exist at and intermediate adjacent pairs of rollers. This difference in pressure, however, should not be so great that the minimum pressure will be insufficient to maintain an unbroken glue line. This pressure difference will be discussed more in detail hereinafter.

All the rolls may be of exactly similar construction. Each comprises a head 12, at each end, said heads being formed with an internal annular flange 13, adapted to receive the tubular portion 14 on its outer surface and to carry the insulating cylinder 15 in its inner face. Each head 12 is also provided with a hollow shaft or trunnion 16, extending outward therefrom, on which the driving sprocket wheels 17 are mounted, said sprocket wheels being driven by suitable chains 18 in the usual manner. A pair of collector rings 19 are also mounted on the shaft 16 and electric connections 20 lead therefrom to the ends of the heating coil 21 wound on the outside of the insulating cylinder 15, said heating coil being made of suitable resistance wire, for example nichrome. The electric current is conducted to the respective rings 19 by suitable brushes 22 mounted on a suitably supported insulating strip 23, said brushes being connected to the two sides of an energized electric circuit 24. The main portion of each roll is composed of the heavy tube 14 of metal extending between the two heads 12 and completely enclosing the heating unit composed of the cylinder 15 and the heating wires 21. The cylinder 15 and the strips 23 may conveniently be made of porcelain or other good insulator. The heating wires 21 are close to but do not touch the tube 14.

The lower rolls 2 are supported by the bearings 25 mounted on the main frame 1 of the machine. The upper rolls 4 are mounted on bearings 26 which are hung from and pressed down by the supplemental frame 3, by means of rods 27, slidably mounted in said frame 3, and having compression springs 28 pressing downward on shoulders 29 on the rods. The springs 28 are all of substantially the same strength. The pressure exerted by the springs 28 is controlled by the position of the supplemental frame 3. This frame is adjustably supported from the fixed frame 1 by means of screw rods 30 passing through threaded lugs 31, formed on the frame 1, and rotated therein by suitable shafting and gears, whereby each entire supplemental frame is moved equally at all parts. Thus the pressure on the panels as they pass through the machine may be adjusted from end to end thereof, by making suitable adjustments of the successive supplemental frames 3.

The action of the exemplification of Figs. 1-5 may be briefly described as follows: The panels having the freshly applied glue are fed continuously from the receiving table 32, between the moving sheets 6 and 7 and thus pass between the heated pressure rolls 2 and 4 with the sheets. The temperature of these rolls is maintained preferably above 200° F. and they transfer their heat to the sheets 6 and 7 which, in turn, transmit the heat to the panel at the same time that it is under pressure. The panel glue is thereby set, that is, converted while being subjected to heat and pressure to a form capable of making the plies adhere permanently to each other. The speed of drying of the glue in the panel will depend on the kind of glue used, the temperature of the rolls, and the conductivity and condition of the wood. The panels are discharged onto the table 33.

The machine so far described is that of my prior application Serial No. 738,640 above referred to; and while such machine is very useful, I have found that certain modifications thereof lead to greater efficiency in mass production and to the capability of one machine of pressing effectively panels varying greatly in width whereby narrow panels can be run through along one side of the machine, leaving the other side empty if desired but with an even distribution of pressure over such narrow panels.

Referring to Figs. 6, 7, 9 and 10, I apply pressure, instead of by the springs 28 of Figs. 2 and 3, by means of pistons in cylinders where the pressure may be exerted either by a liquid or by a gas, and of these I prefer gas pressure due to the resiliency thereof whereby accidental faulty bumps are easily overridden and the particular faulty panel may, if desired, be scrapped on egress from the machine.

In this modification the pressure exerted upon the work by the rollers 14 is caused by the cylinders 41, within which are pistons 42 (Fig. 7) pressed downwardly by the fluid pressure thereabove. Piston rods 43 attached to the pistons are each pivotally connected to one end of the arms 44, the other ends of which are pivoted to the upright parts 44a of the machine frame as at 45.

The rollers 14 are driven by shafts 46, 47, at the ends of which are gears 46a and 47a intermeshing within the gear housing 48 to cause the rollers to move preferably at the same peripheral speed, the rollers 14 being preferably (but not necessarily) of the same diameter. The upper shafts 46 are supported by and rotate within bearings 49; and the lower shafts 47 are similarly supported by and rotate within bearings 50, which latter bearings are suitably supported as by a metal bar 51 upon the machine framework. The lower roller may be driven from the driveshaft 51a by the gearing 52, 53 and 54.

The lower end of the cylinder is suitably pivoted at a fixed support, as at 55. Rollers 56 are mounted on the arms 44 for rotation and the shafts on which these rollers may rotate are positioned in openings in the arms 44 and in openings 63 in inverted-U-shaped frames 64, which frames carry each a wedge-shaped member 65. A bar 66 is mounted for longitudinal movement in either direction in slots 66a in the uprights 44a and in openings 67 in the U-member, as shown in Figs. 11 and 12. The bars 66 rest on the bottoms of the slots 66a but the openings 67 are long enough vertically to permit the U-frame 64 to ride upwardly. The bar carries wedge-shaped parts 68 under each of the wedge-shaped members 65 to lift said wedge-shaped members 65 simultaneously by movement of the bar to the left, as shown on Fig. 6, and thereafter to permit the same to be lowered on movement of the bar to the right. The end of the bar is round and threaded as at 69, with a hand-wheel 70 threaded thereon and held from movement other than rotation by the fixed bearings 71.

Turning of the hand-wheel 70 will thus cause the bar 66 to move either to the right or to the left, depending on the direction of rotation of the hand-wheel. When the wedge-shaped members 65 are moved upwardly by movement of the bar 66 to the left, as shown on Figs. 6 and 11, they cause a corresponding movement of the inverted-U-shaped members and of the roller 56, thereby limiting the minimum movement possible of the rollers, this limit being varied by the position of the bar 66.

In the embodiment of the invention described and illustrated on Figs. 6-12, the lower rolls rotate in fixed bearings 47, while the bearings 49 on both sides of the machine may be adjusted vertically. Pressure as described within the cylinders 41 tends to pull the bearings 49 downwardly, while this downward movement may be variably limited by adjustment of the hand-wheel 70. This is particularly useful when narrow panels are to be run through at one side of a wide machine since there will generally be a tendency for the upper rolls to tip downwardly at the vacant side of the machine and thereby exert unequal pressures on the work. This tipping may be prevented by suitable adjustment of the hand-wheel. I have found that the adjusting means on both sides of the machine results in greater flexibility but it is, of course, understood that the adjusting means may be omitted on either side.

The control of fluid pressure to the cylinders is not illustrated; it may actuate all the cylinders simultaneously or it may be arranged to control the pressure of the rollers in groups (group control of pressure being also shown in my prior patent and applications above referred to), in case it be desired to vary the pressure exerted on the work as it passes through the machine.

Each cylinder may cause the exertion of pressure on the bearings of more than one roller. Referring to Fig. 8, piston rods 57 actuated by pistons within the cylinders 58 have equalizing arms 59 pivoted thereto centrally of the equalizing arm at 60, while pivoted to each end of the equalizing arm at 61 are actuating arms 62 connected to links 44. To produce the same force the cylinders and pistons are made of correspondingly larger diameter. It is, of course, understood that each piston can cause pressure on a still greater number of bearings for the rollers. The pulleys 9 may each be fixed to a shaft 80 which rotates in bearings 81 or they may rotate on the shaft, and these bearings may be adjusted as to position by bolts 82 by rotating them in the nuts 83 affixed to the framework. Slack in the bands 6 and 7 may thus be taken up.

The panels are run through the machine after the glue has been applied and after assembly of the plies with the glue between them into a panel. They may be dried to a very substantial degree in passing through the machine, that is, during the hot-pressing operation; but I prefer to have the hot-pressing operation merely so affect the glue while the plies are held or pressed together that it will cause the plies to adhere very firmly to each other, the actual drying down to the desired water-content being accomplished after exit of the hot-pressed panels from the machine, although some moisture will of course be lost in the hot-pressing operation.

The pressure exerted on the panels in the machine can be such as to compress the wood and alter the wood fibers or their relative positions; but as a rule I prefer to press the panels only sufficiently to cause the desired firm adherence of the plies to each other without permanently compressing or changing the natural characteristics of the wood.

The sheets 6 and 7 are preferably of steel and need not necessarily be endless for they may be plates or strips. Whatever their form, they should have a certain degree of rigidity and a certain degree of flexibility, such that they will impart the pressure exerted by the rollers not only directly to the panel parts between the rollers of a pair, but also indirectly to the panel parts in the lateral spaces between the pairs of rollers, so that the panels will be subjected to a continuous but pulsating or undulating pressure as they pass through the machine. The variations in the pressure as the panel moves from point to point in the machine may thus be controlled, as may the degree of pressure at each point.

With the proper flexibility of the bands or plates, particularly with relation to the spacing between the pairs of rollers, the pressure variations on the panel as it passes through the machine can be controlled at will. The maximum pressures which will occur at points between the rollers of a pair may be adjusted, if desired, at different points of the machine by suitable settings thereof. The minimum pressures which will occur at points midway between the pairs of rollers may be controlled by a proper choice of distance between pairs of rollers and the degree of flexibility of one or both sheets.

I have discovered that a better effect is obtained if the pressures at the points midway between the pairs of rollers is below, but only slightly below, the pressures between the pairs of rollers; in other words, the pressure curve should be wavy but not permitting breaking of a glue line. Such a pulsating pressure means that as the panel travels through the machine, there will be a periodic give of the pressure applied thereto, which kneads or pumps the glue into the open pores of the wood, so that when the glue has set, the panel is very much stronger than one produced by the same glue under the same operating conditions without the pulsation in the pressure.

The fluid-controlled or pneumatically-controlled as well as the spring-controlled pressure means are preferably but not necessarily so arranged as to cause the exertion of increased pressures on succeeding sets of pairs of rollers so that the pressure on the work increases as it passes through the machine; but it is within the scope of the invention to have each set of rollers exert pressure to the same degree as the others, to have succeeding sets exert less pressure than the preceding ones, or to adjust the pressures at various parts of the machine to meet requirements.

The machine having the heating means is intended primarily for hot-pressing operation, that is, with the simultaneous application of heat and pressure. There are instances however where the kneading or pumping effect of the pulsating pressure is useful in cold-pressing, that is, where pressure is applied without heating the rolls or the work, for example at normal or room temperature. In such instances the heating means may be left inoperative or it may be omitted from the machine.

I use the term "sheet" herein as including both plates and bands, whether endless or not.

While I have described various details, yet it is to be understood that my invention is not limited thereto since changes may be made within the spirit of the invention the scope of which is defined in the appended claims; and while the claims refer to the treatment of wood veneer, I intend them to include analogous porous materials such as paper board and the like, as well as the gluing of paper to wood.

Having described my invention, what I claim and desire to secure by Letters Patent is:

1. A machine for the gluing of wood, comprising a series of spaced means for exerting pressure on the wood to be glued, flexible means between said first mentioned means and the wood to transmit said pressure in constantly varying amounts to all parts of the wood, the stiffness of said second mentioned means being such that it will constantly vary the pressure transmitted by it to the wood from a maximum pressure at the spaced means to a minimum pressure intermediate said means to cause the glue to be kneaded into the wood, the minimum of said varying amounts of pressure exerted on the wood being sufficient to maintain an unbroken glue line, means for moving one of said means with respect to said other means, and means for supporting the wood in contact with said flexible means.

2. A machine for the gluing of wood comprising a series of spaced means for exerting pressure on the wood to be glued, a thin metal sheet between said first mentioned means and the wood and adapted to transmit this pressure in varying amounts to all parts of the wood, the stiffness of said metal sheet being such that it will vary the pressure transmitted by it to the wood from a maximum pressure at the spaced means to a minimum pressure intermediate said means to cause the glue to be kneaded into the wood, the minimum of said varied amounts of pressure exerted on the wood by said thin metal sheet being sufficient to maintain an unbroken glue line, means for moving said thin metal sheet relatively to said first mentioned means, and means for supporting the wood in contact with the said thin metal sheet.

3. A machine for the gluing of wood comprising a series of spaced means for exerting pressure on the wood to be glued, fluid pressure means for transmitting pressure to the series of spaced means, flexible means between said series of spaced means and the wood and adapted to transmit this pressure in varying amounts to all parts of the wood, the stiffness of said second mentioned means being such that it will vary the pressure transmitted by it to the wood from a maximum pressure at the spaced means to a minimum pressure intermediate said means to cause the glue to be kneaded into the wood, the minimum of said varied amounts of pressure exerted on the wood being sufficient to maintain an unbroken glue line, means for moving said flexible means with respect to the first mentioned spaced means, and means for supporting the wood in contact with the second mentioned flexible means.

4. A machine for the gluing of wood comprising a series of spaced means for exerting pressure on the wood to be glued, fluid means for applying pressure to said spaced means, means for regulating the pressure exerted by said fluid, additional means for limiting the movement of said spaced means in pressure-transmitting direction independent of the fluid means for applying pressure, flexible means between said spaced means and the wood adapted to transmit pressure in varying amounts to all parts of the wood, the stiffness of said flexible means being such that it will vary the pressure transmitted by it to the wood from a maximum pressure at the spaced means to a minimum pressure intermediate said means to cause the glue to be kneaded into the wood, the minimum of said varied amounts of pressure exerted on the wood being sufficient to maintain an unbroken glue line, means for moving said flexible means with respect to the series of spaced means, and means for supporting the wood in contact with said flexible means.

5. A machine for the gluing of wood comprising a series of spaced rollers for exerting pressure on the wood to be glued, said rollers being carried in movable bearing members, means for exerting pressure on each of the rollers comprising a pivoted lever and a fluid operated piston, the end of said piston being attached to said pivoted lever at a point remote from its pivot, means intermediate the ends of each lever and contacting said bearing members for each roller for transmitting pressure to said roller through its bearings, flexible means between said rollers and the wood and adapted to transmit said pressure in varying amounts to all parts of the wood, the stiffness of said flexible means being such that it will vary the pressure transmitted by it to the wood from a maximum pressure at the spaced rollers to a minimum pressure intermediate said rollers to cause the glue to be kneaded into the wood, the minimum of said varied amounts of pressure exerted on the wood being sufficient to maintain an unbroken glue line, means for moving said flexible means with respect to the rollers, and means for supporting the wood in contact with the flexible means.

6. A machine for the gluing of wood comprising an upper series of rolls, a lower series of rolls, means for pressing said upper and lower series one toward the other, two sheets adapted to pass between said series in contact therewith and to carry the work between them, at least one of said sheets being of thin metal and adapted to transmit the pressure exerted by said pressing means in varying amounts to all parts of the work, the stiffness of said thin metal sheet being such that it will vary the pressure transmitted by it to the work from a maximum pressure at the rolls to a minimum between them to cause the glue to be kneaded into the wood, the minimum of said varied amounts of pressure exerted on the work being sufficient to maintain an unbroken glue line.

7. A machine for the gluing of wood comprising an upper series of rolls, a lower series of rolls, means for pressing said upper and lower series one toward the other, two thin metal sheets adapted to pass between said series in contact therewith and to carry the work between them, said thin metal sheets being adapted to transmit the pressure exerted by said pressing means in varying amounts to all parts of the work, the stiffness of said thin metal sheets being such that they will constantly vary the pressure transmitted by them to the work from a maximum pressure at the rolls to a minimum between them to cause the glue to be kneaded into the wood, the minimum of said varied amounts of pressure exerted on the work being sufficient to maintain an unbroken glue line.

8. A machine for the gluing of wood comprising an upper series of rolls, a lower series of rolls, pneumatic means for pressing said upper and lower series one toward the other, two sheets adapted to pass between said series in contact therewith and to carry the work between them, at least one of said sheets being of thin metal and adapted to transmit the pressure exerted by said pressing means in varying amounts to all parts of the work, the stiffness of said thin metal sheet being such that it will vary the pressure transmitted by it to the work from a maximum pressure at the rolls to a minimum between them to cause the glue to be kneaded into the wood, the minimum of said varied amounts of pressure exerted on the work being sufficient to maintain an unbroken glue line.

9. A machine for the gluing of wood comprising an upper series of rolls, a lower series of rolls, means for pressing said upper and lower series one toward the other, two sheets adapted to pass between said series in contact therewith and to carry the work between them, at least one of said sheets being of thin metal and adapted to transmit the pressure exerted by said pressing means in varying amounts to all parts of the work, the stiffness of said thin metal sheet being such that it will vary the pressure transmitted by it to the work from a maximum pressure at the rolls to a minimum between them to cause the glue to be kneaded into the wood, the minimum of said varied amounts of pressure exerted on the work being sufficient to maintain an unbroken glue line, and means at one side of said series to limit the approach of one toward the other to prevent tilting of one series when work narrower than the rolls is passed between said series at the other side thereof.

GEORGE H. OSGOOD.